United States Patent [19]

Jaggar

[11] Patent Number: 5,506,976
[45] Date of Patent: Apr. 9, 1996

[54] BRANCH CACHE

[75] Inventor: David V. Jaggar, Cherry Hinton, United Kingdom

[73] Assignee: Advanced RISC Machines Limited, Cambridge, United Kingdom

[21] Appl. No.: 303,230

[22] Filed: Sep. 8, 1994

[30] Foreign Application Priority Data

Dec. 24, 1993 [GB] United Kingdom .................... 9326439

[51] Int. Cl.$^6$ ...................................................... G06F 13/00
[52] U.S. Cl. ..................... 395/375; 395/464; 364/243.41; 364/261.7; 364/938.2; 364/964.24; 364/DIG. 1; 364/DIG. 2
[58] Field of Search .................................... 395/375, 464; 364/243.41, 261.7, 938.2, 964.24

[56] References Cited

U.S. PATENT DOCUMENTS

| | | | |
|---|---|---|---|
| 4,858,104 | 8/1989 | Matsuo et al. | 364/200 |
| 5,101,341 | 3/1992 | Circello et al. | 395/375 |
| 5,131,086 | 7/1992 | Circello et al. | 395/375 |
| 5,237,666 | 8/1993 | Suzuki et al. | 395/375 |

FOREIGN PATENT DOCUMENTS 2250840  6/1992  United Kingdom .............. G06F 9/38

*Primary Examiner*—Tod R. Swann
*Assistant Examiner*—Frank J. Asta
*Attorney, Agent, or Firm*—Albert C. Smith; John T. McNelis

[57] ABSTRACT

A pipeline processor 2 having an associated branch cache 4 is provided. Each cache line 12 of the branch cache stores a cache TAG, a next branch data value R, a target address value TA and a target instruction value TI. The next branch data value indicates when the next branch instruction will be encountered in the stream of instructions fed to the pipeline processor. This data is used such that following a branch cache hit, no further reading of the branch cache is made until the next branch data indicates that the next branch instruction should have been reached. At this stage, the branch cache 4 is read to see if it contains corresponding data for that next branch instruction that will avoid the need to decode that next branch instruction before instructions from the target address of that branch instruction can be fed into the pipeline. The avoiding of the need to read the branch cache for every instruction fed into the pipeline saves power.

10 Claims, 5 Drawing Sheets

BRANCH CACHE

BACKGROUND OF THE INVENTION

1. Field of the Invention

This invention relates to the field of data processing using a branch cache.

2. Description of the Prior Art

It is known to provide computers that use pipelining techniques to divide the execution of each instruction into several phases, normally called pipeline stages. In order to obtain good performance from such systems it is important that there should be a smooth and continuous flow of instructions through the pipeline. Branch instructions within the stream of instructions being executed tend to interrupt this desired smooth flow. In order to execute a branch instruction, the instruction must be identified as a branch instruction, if the branch is conditional, then the processor must decide whether the branch is to be taken, the target address of the branch must be determined and then the next instruction fetched from that target address. The presence of branch instructions within an instruction stream of a pipelined processing system degrades performance since all of the above processing needs to be performed before the next instruction can be Fed into the pipeline.

In order to reduce the above problem, it is known to provide branch caches. A branch cache shortens the execution time of branch instructions by supplying the target address of a branch from a cache rather than decoding the branch instruction. This is typically achieved by providing a branch cache with cache tags that are the addresses of branch instructions and whose cache data is the address of the instruction at the branch target. Each instruction being fed into the pipeline has its instruction address compared with the cache tags within the branch cache and if a cache hit occurs, then a branch instruction is identified and the branch target address is supplied from the branch cache to cause the processor to start loading instructions into the pipeline from the target address without needing to fully decode the branch instruction.

Examples of such branch caches are described in IEEE Transactions on Computers, Vol. 42, No. 4, April 1993, page 396, "Branch Target Buffer Design and Optimization" by Chris H. Perleberg and Alan Jay Smith and IEEE Technical Report No. CSL-TR-92-553, December 1992, "Branch Prediction Using Large Self History" by John D. Johnson.

Whilst the use of such branch caches is successful in decreasing the delays caused by branch instructions within pipeline systems, it introduces a problem of increasing the power consumption of the system. Having to compare the instruction address of each instruction fed into the pipeline with all of the cache tags of the cache memory consumes a disadvantageously large amount of power. It is a constant aim within the field to reduce power consumption both to assist in the production of portable battery powered equipment and to reduce heat dissipation problems.

SUMMARY OF THE INVENTION

An object of the invention is to address the abovementioned problems.

Viewed from one aspect, this invention provides apparatus for processing data comprising:

(a) a pipeline processor For processing a stream of instructions;

(b) a branch cache memory having a plurality of cache lines, each said cache line being operable to store:

(i) a cache tag identifying an address of a branch instruction within said stream of instructions; and (ii) next branch data identifying an address of a next branch instruction processed following said branch instruction; and (c) cache read triggering means which responds when said next branch data of a most recently read cache line identifies an address being processed by said pipeline processor to trigger comparison of said cache tags of said plurality of cache lines with said address being processed by said pipeline processor.

The provision of the next branch data within the branch cache has the desirable result that this data can then be used to predict when the next branch instruction will occur and thus control reading of the cache to test for a cache hit when the instruction being processed is indicated to be a branch instruction. This reduces the number of read operations that need to be made to the branch cache and so desirably reduces the power consumption of the system whilst maintaining the performance advantages given by a branch cache.

It will be appreciated that each cache line could store data identifying the address of the instruction to be executed following the branch instruction which the cache tag for that cache line identifies. This is the usual way in which a branch cache is organised. However, in such an arrangement, the cache hit must be identified, the target data recovered from the cache and the target data applied to the processor before the processing may continue.

In preferred embodiments of this invention each cache line is operable to store a branch target pointer identifying an address of a target instruction to be processed after said next branch instruction of said cache line and comprising target address means for controlling branching of said stream of instructions to said target instruction using said branch target pointer when said next branch data of said most recently read cache line identifies said address being processed by said pipeline processor.

In this way, each cache line with a cache tag associated with a particular branch instructions stores the target address of the succeeding branch instruction. Thus, when a cache line is read, the next branch data from that cache line identifies where the next branch will occur and the branch target pointer from that cache line identifies to where that next branch moves the processing. Accordingly, when the next branch data indicates that the branch has been reached, the branch target pointer has already been recovered from the cache and is available for direct use by the processor.

In a similar manner, in preferred embodiments of the invention each cache line is operable to store said target instruction and comprising target instruction means for supplying said target instruction of said cache line to said pipeline processor when said next branch data of said most recently read cache line identifies said address being processed by said pipeline processor.

In accordance with this feature, the target instruction for the next branch instruction is stored in each cache line and so is immediately available when that next branch instruction is reached. The cache may store a plurality of instructions For each branch. This can increase the time available for dealing with a branch, but this is balanced by the increase needed in cache size.

Another preferred feature of the invention is that, for each cache line, said cache tag comprises an address of an instruction immediately preceding said branch instruction.

In this way, each branch instruction can be identified by the address of the preceding instruction and so, when that preceding instruction reaches the pipeline, it can trigger a branch cache look-up to recover the target address for the branch instruction without the branch instruction itself ever having to be loaded into the pipeline.

In an analogous manner, it is preferred that, for each branch line, said next branch data identifies an address of an instruction immediately preceding said next branch instruction.

It will be appreciated that the next branch data could take a number of forms. For example, the next branch data could take the form of a number of instructions to be executed before the next branch instruction is reached. This number could then be counted down with each instruction executed until the next branch instruction was reached. Another alternative would be to utilise the instruction address of the next branch instruction. However, in accordance with a preferred feature of this invention said next branch data comprises lower order bits of an address.

The use of only the lower order bits of the address of the next branch instruction as the next branch data has the advantage of reducing the number of bits that need to be stored in the branch cache whilst not significantly impacting the performance of the system. In practice, most branches are relatively short and so the lower order bits of the address are generally sufficient to specify the address of the next branch instruction.

A convenient manner of embodying the cache read triggering means is to provide a program counter register for storing said address being processed by said pipeline processor and wherein said cache read triggering means comprises a comparator for comparing said address from said program counter register and said next branch data to generate an enable signal for said branch cache memory.

In order that the branch cache can be conveniently filled with valid data it is preferred to provide a branch instruction detector for detecting branch instructions within said stream of instructions to generate a branch detect signal, cache write means responsive to said branch detect signal for writing to a cache line next branch data derived from said address being processed by said pipeline processor and a cache tag derived from an address being processed by said pipeline processor when an immediately preceding branch instruction was detected.

In embodiments of the invention that also utilise a branch target pointer and target instruction within each cache line, it is desirable that said cache write means decodes said branch instruction to determine and write to said cache line said branch target pointer and said target instruction.

Viewed from another aspect this invention provides a method of processing data comprising the steps of:

(a) pipeline processing a stream of instructions;

(b) storing in each cache line of a branch cache memory having a plurality of cache lines:

(i) a cache tag identifying an address of a branch instruction within said stream of instructions; and (ii) next branch data identifying an address of a next branch instruction processed following said branch instruction; and (c) responding when said next branch data of a most recently read cache line identifies an address being processed by said pipeline processor to trigger comparison of said cache tags of said plurality of cache lines with said address being processed by said pipeline processor.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
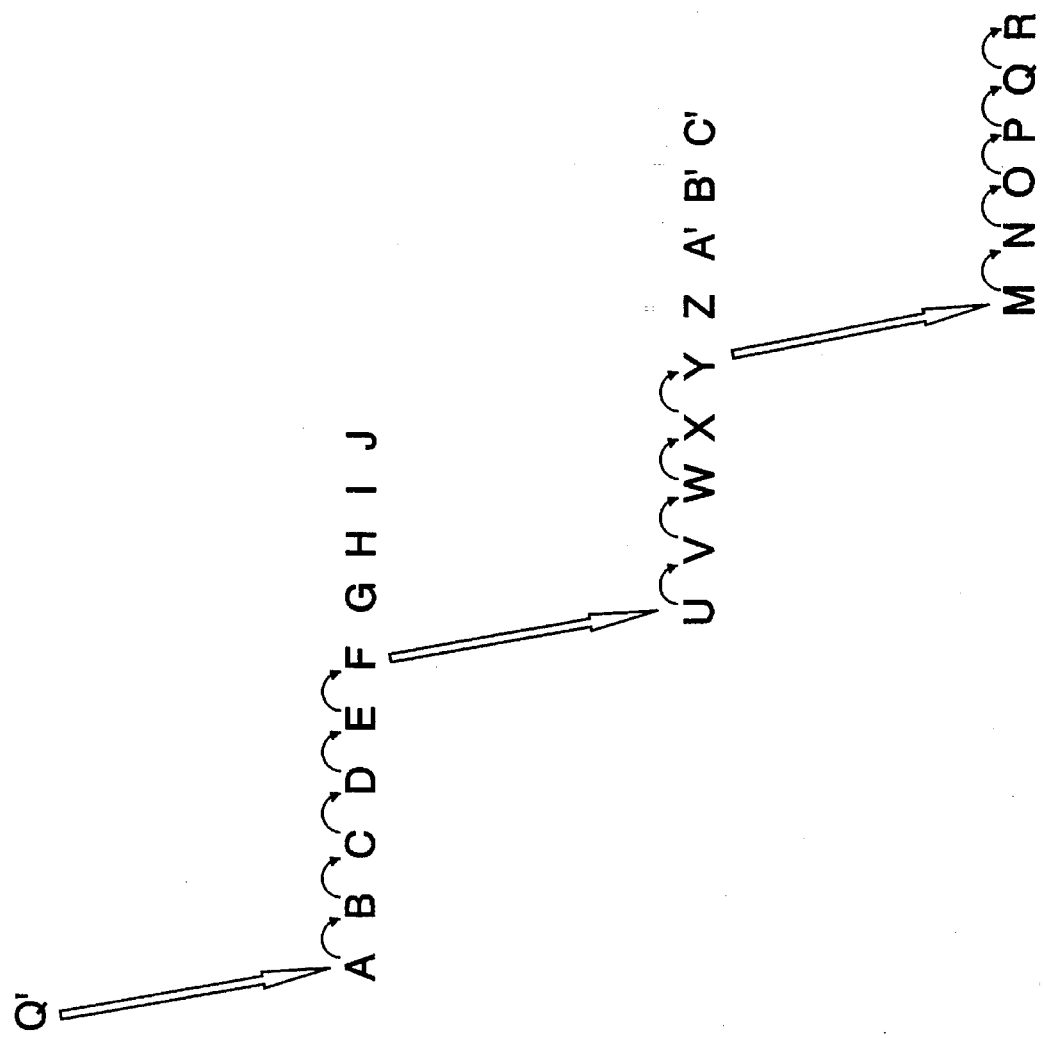
FIG. 1 illustrates an instruction sequence including branch instructions.

FIG. 1 shows a sequence of instructions including branch instructions. The processing of instructions proceeds sequentially along the instruction addresses until a branch instruction, such as instruction F or instruction Y, is reached. The pipeline processing will typically be broken down into a number of pipeline stages such as instruction fetch, instruction decode, operand fetch, execution and result writeback. Accordingly, a branch instruction will not be fully recognised until it has moved several stages along the pipeline during which time inappropriate instructions will have been fed into the pipeline from the sequence of instruction addresses that should not follow as a consequence of the branch being taken.

In the case illustrated in FIG. 1, the branch instruction F causes a branch to the instruction U. Accordingly, the instructions G, H, I, J, . . . should not be processed following the branch instruction F. In a similar manner, following the branch to instruction U, the processing proceeds through instructions V, W and X until another branch instruction Y is reached. The branch instruction Y re-directs processing to the instruction M from where it again proceeds sequentially.

The problems associated with the occurrence of such branch instructions within a pipeline processing system are known. Table 1 illustrates these problems and shows the instructions being acted upon by differing pipeline stages as the processing progresses through the sequence illustrated in FIG. 1. In Table 1 it is assumed that a branch instruction is not fully recognised and decoded until it reaches the final result writeback stage at which the address to which the branch points is available. Accordingly, in Table 1 the processing proceeds with the branch instruction F progressing along the pipeline until it is fully recognised at the result writeback stage. By this time, the instructions G, H, I and J have already been loaded into the preceding pipeline stages although they are not in fact to be executed in view of the branch instruction F. In order to deal with this, pipeline processors are provided with back-out mechanisms whereby partially processed instructions can be aborted. This is illustrated by the dashes in Table 1.

Thus, when the branch F has reached the result writeback stage, the instructions G, H, I and J are aborted and the target instruction U from the target addresses indicated by the branch F is loaded into the instruction fetch stage. The sequence of instructions V, W, X . . . following the target instruction U are then loaded into the pipeline upon subsequent processing cycles.

The result of the inappropriate loading of the instructions G, H, I and J into the pipeline and their subsequent aborting results in four instruction cycles during which no useful processing output is derived from the pipeline processor whilst the correct sequence of instructions are fed through the processor to reach the result writeback stage.

TABLE 1

| Result Writeback <<<<---- | Execution <<<<---- | Operand Fetch <<<<---- | Instruction Decode <<<<---- | Instruction Fetch <<<<---- |
|---|---|---|---|---|
| A | B | C | D | E |
| B | C | D | E | F |
| C | D | E | F | G |
| D | E | F | G | H |
| E | F | G | H | I |
| F | G | H | I | J |
| — | — | — | — | U |
| — | — | — | U | V |
| — | — | U | V | W |
| — | U | V | W | X |
| U | V | W | X | Y |
| V | W | X | Y | Z |
| W | X | Y | Z | A' |
| X | Y | Z | A' | B' |
| Y | Z | A' | B' | C' |
| — | — | — | — | M |
| — | — | — | M | N |
| — | — | M | N | O |
| — | M | N | O | P |
| M | N | O | P | Q |
| N | O | P | Q | R |

Table b 2illustrates the same sequence of processing within a system having a branch cache. In this system, each instruction fed into the instruction fetch stage of the processor is compared with the cache tags of a branch cache. The branch cache includes data for branch instructions indicating the target instruction address for the branch in question. Thus, when the branch instruction F is fed into the instruction fetch stage, a branch cache hit occurs and the instruction address for the instruction U is recovered from the branch cache enabling the instruction U to be loaded on the immediately succeeding instruction cycle.

TABLE 2

| Result Writeback <<<<---- | Execution <<<<---- | Operand Fetch <<<<---- | Instruction Decode <<<<---- | Instruction Fetch <<<<---- |
|---|---|---|---|---|
| A | B | C | D | E |
| B | C | D | E | F |
| C | D | E | F | U |
| D | E | F | U | V |
| E | F | U | V | W |
| F | U | V | W | X |
| U | V | W | X | Y |
| V | W | X | Y | M |
| W | X | Y | M | N |
| X | Y | M | N | O |
| Y | M | N | O | P |
| M | N | O | P | Q |
| N | O | P | Q | R |

In this way, even though the branch instruction F is not fully decoded until it reaches the result writeback stage, the instructions U, V, W and X have already been loaded into the preceding pipeline stages. Thus, redundant processing cycles following branch instructions as illustrated in Table 1 do not occur.

The operation illustrated in Table 2 assumes that the branch data necessary is present within the branch cache. If this is not the case, then the branch instruction would need to be decoded as illustrated in Table 1. In this case, in order to determine the branch target, a number of redundant processing cycles will necessarily result. The same is also true of conditional branches. In this case, if the most frequent outcome of the conditional test is that the branch is taken, then branch data can be stored in the cache and the branch assumed to be taken even though it has not been fully decoded. On average, this will save processing time. The determination of whether a conditional branch is more or less likely to be taken can be made upon compilation of the program or alternatively could be made using a rule such as backward branches are generally taken and forward branches are generally not taken.

Table 3 illustrates a refinement of the branch cache system of Table 2. In this case, the cache tags used are the instruction addresses of the instructions preceding the branch instruction, e.g. instruction E and instruction X. Thus, when these instructions are entered into the instruction fetch stage of the pipeline and a cache hit occurs, it is recognised that the succeeding instruction is a branch instruction whose target is already known. Thus, there is no need to actually place the branch instruction into the pipeline and the target instruction of the branch can be placed directly into the pipeline. As illustrated in Table 3 processing in this manner proceeds directly from instruction E to instruction U and from instruction X to instruction M. This refinement speeds the processing.

TABLE 3

| Result Writeback <<<<---- | Execution <<<<---- | Operand Fetch <<<<---- | Instruction Decode <<<<---- | Instruction Fetch <<<<---- |
|---|---|---|---|---|
| A | B | C | D | E |
| B | C | D | E | U |
| C | D | E | U | V |
| D | E | U | V | W |
| E | U | V | W | X |
| U | V | W | X | M |
| V | W | X | M | N |
| W | X | M | N | O |
| X | M | N | O | P |
| M | N | O | P | Q |
| N | O | P | Q | R |

Figure 2:
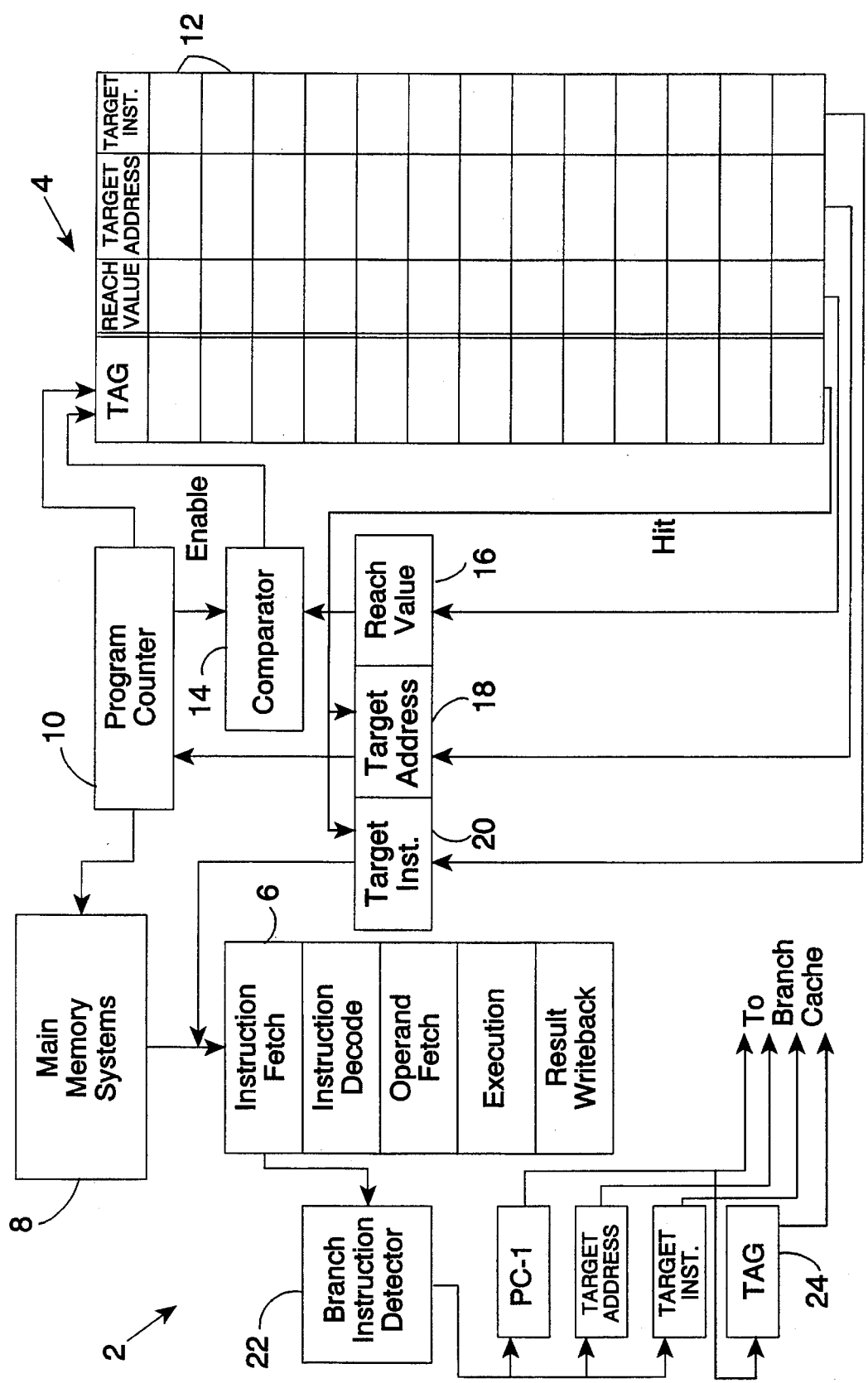
FIG. 2 illustrates a branch cache and pipeline processor arrangement.

FIG. 2 schematically illustrates a system including a pipeline processor 2 and a branch cache 4. The pipeline processor 2 has five pipeline stages: instruction fetch, instruction decode, operand fetch, execution and result writeback. It will however be appreciated that pipelines having different numbers of pipeline stages could be used.

Instructions are fed into an instruction fetch stage 6 of the pipeline 2 from connected main memory systems 8 (such as RAM or ROM) under control of a program counter register 10 storing a program counter value PC that represents the address of the instruction to be fed to the pipeline 2.

The branch cache 4 comprises a plurality of cache lines 12 each storing a cache tag (TAG), a reach value (R; "next branch data"), a target address (TA) and a target instruction (TI). The branch cache 4 is normally in a low power consumption state with the cache tags only being compared with the program counter value PC when an enable signal from a comparator 14 is asserted ON. When the branch cache 4 is enabled, the program counter value PC is compared in parallel with the cache tag values of each of the cache lines 12. IF a cache hit occurs upon such comparison, the reach value R, the target address value TA and the target instruction value TI are output from the branch cache 4 and stored within respective ones of a reach value latch 16, a target address latch 18 and a target instruction latch 20.

The enable signal is asserted ON by the comparator 14 when the comparator 14 determines that the reach value R currently stored within the reach value latch 16 matches the lower order bits of the program counter value PC stored within the program counter register 10. If the instruction addresses are 16-bit addresses, then storage capacity within the branch cache 4 can be saved by only requiring the reach value R to be an 8-bit word. In this way, the reach value R is compared with the lowermost eight bits of the program counter value PC.

It will be appreciated that the action of the reach value latch 16 and the comparator 14 is to generate a signal indicative of the next branch instruction having been reached. However, due to the reach value only being eight bits of the Full address, it is possible that whilst the reach value R may match the lowermost eight bits of the program counter value PC, the true position of the next branch instruction has not been reached and a cache hit will not occur when the program counter value PC is compared with the cache tags within the branch cache 4. The resolution of the reach value R is $2^8 = 256$ and so, at worst, inappropriate attempts to read the branch cache 4 to derive a cache hit will only occur once in every 256 instruction cycles. This is a worthwhile compromise given the saving in storage capacity within the branch cache 4 through not having to save the full next branch instruction addresses.

Since the enable signal generated by the comparator 14 is not a guarantee that the next branch instruction has been reached, a "true" hit signal is derived from the branch cache 4 when a program counter value PC to cache tag match occurs. This hit signal is used to trigger the reach value latch 16, the target address latch 18 and the target instruction latch 20 to store the respective reach value R, target address TA and target instruction TI from the cache line which generated the cache hit and output their contents from the preceding cache hit to the program counter register 10 and the instruction fetch stage 6 respectively. It will thus be seen that when the reach value R indicates that the next branch instruction has been reached, a cache read occurs to check whether the program counter value PC matches any of the cache tags. If a cache hit occurs, then the target address TA and target instruction TI from the preceding cache hit are applied to the program counter register 10 and the instruction fetch stage 6 respectively whilst new values of the reach value R, target address TA and target instruction TI resulting from the present cache hit are latched.

A branch instruction detector 22 monitors the instructions fed into the instruction fetch stage 6 of the pipeline processor 2. When a branch instruction is detected by the branch instruction detector 22 as having been placed in the instruction fetch stage 6, the branch instruction detector 22 triggers a sequence of actions to result in a cache line 12 of the branch cache 4 being written with cache data corresponding to that branch instruction.

Firstly, the lowermost eight bits of the program counter value preceding that corresponding to the branch instruction, i.e. (PC-1), is stored. Then, when the branch instruction has made its way through the pipeline processor to a stage at which its target address TA has been determined, this is stored and when that target address TA has been accessed to recover a corresponding target instruction TI, this is also stored. A TAG latch 24 serves to store the full program counter value PC for the immediately preceding instruction of the preceding cache hit. Thus, the TAG latch 22 stores this program counter value PC from the preceding identification of a branch instruction up until the present branch instruction, whereupon it is used as the cache tag for the present branch instruction. Once the four items of data for a cache line 12 have been collected, the data is written into the branch cache.

Figure 3:
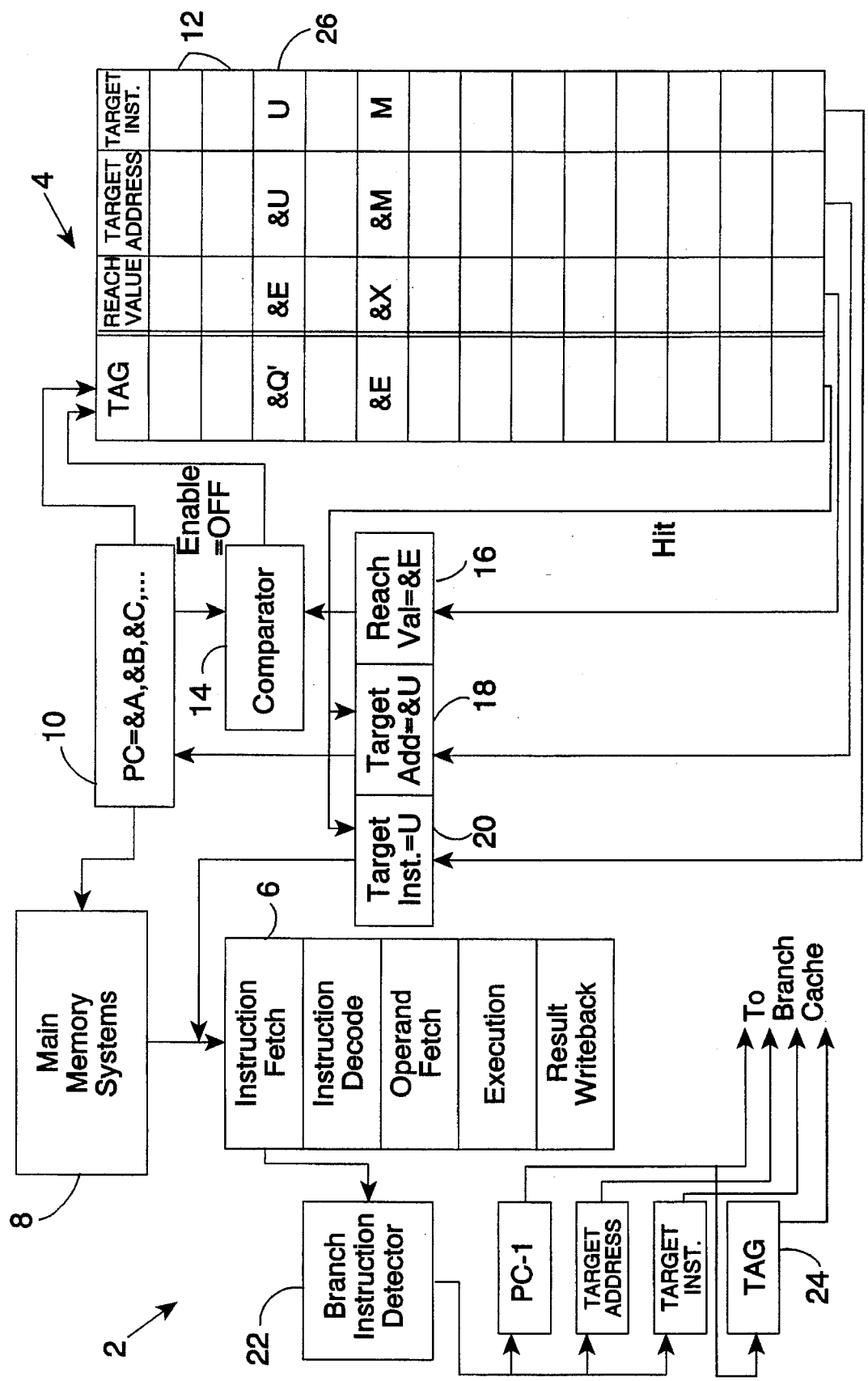
FIGS. 3 and 4 illustrate the use of the branch cache to improve processing speed.

FIG. 3 illustrates the operation of the system of FIG. 2 in recovering data from the branch cache 4. As illustrated, the branch cache 4 is already loaded with the valid cache data required. The program counter value PC starts at an address corresponding to instruction A and proceeds in sequence through instructions B, C and so on.

When the preceding branch instruction was encountered (say at instruction Q'), the data from the cache line 26 was accessed and read into the reach value latch 16, the target address latch 18 and the target instruction latch 20. Thus, the reach value latch 16 stores a value corresponding to the lowermost eight bits of the address of instruction E. As the program counter register 10 advances through the addresses of the instructions A, B, C, . . . , the comparator 14 compares the contents of the reach value latch 16 with the program counter value PC and determines that they are non-matching and so holds the enable signal in an OFF state. With the enable signal in this OFF state, the branch cache 4 is not read and power is saved through the avoiding of making unnecessary attempted reads of the branch cache 4.

Figure 4:
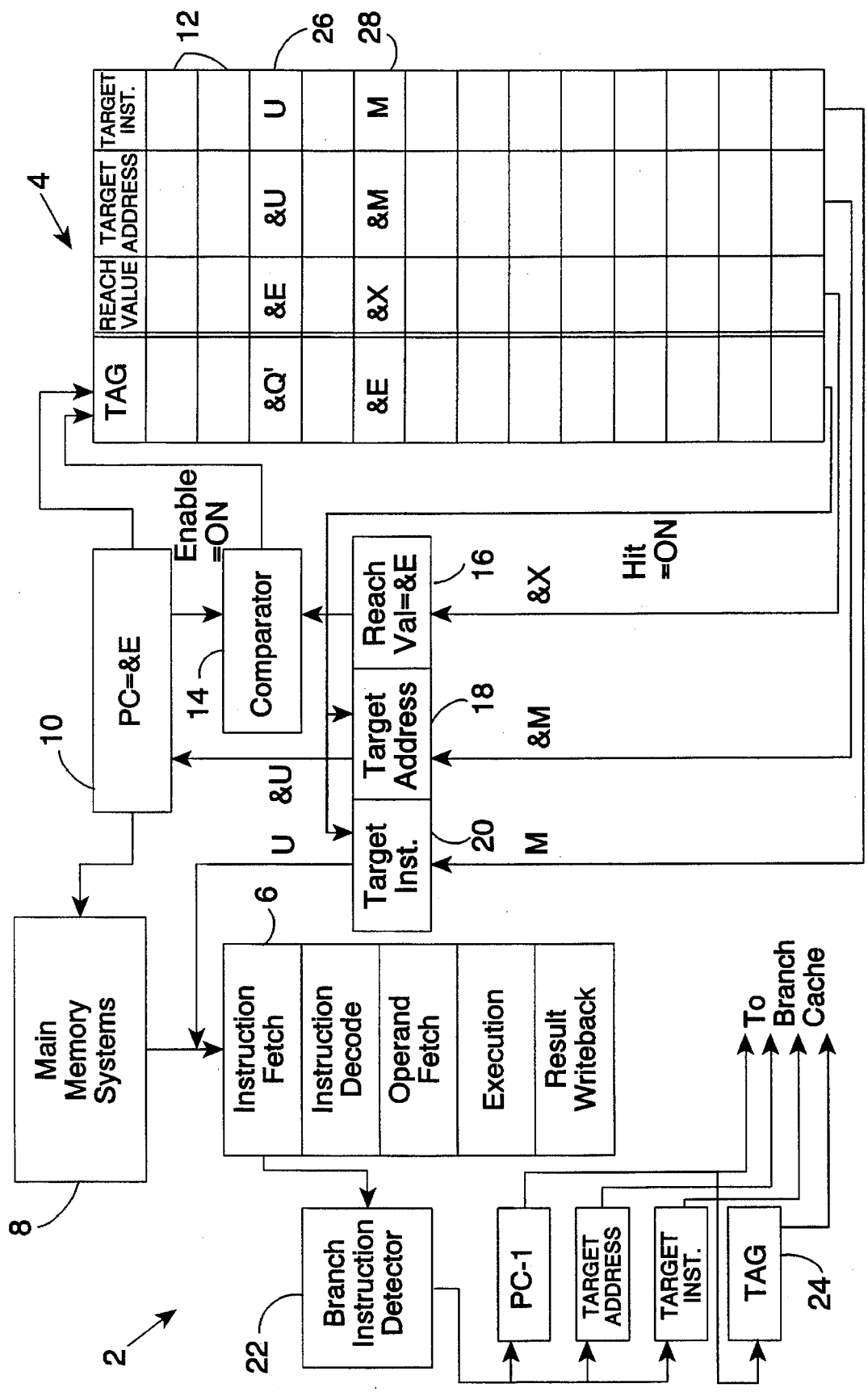

FIG. 4 illustrates the situation when the instruction E starts to be processed by the pipeline 2 and is loaded into the instruction fetch stage 6. At this time, the program counter value PC is equal to the address of instruction E. Thus, the lowermost eight bits of the program counter value PC match the value in the reach value latch 16 and the comparator 14 asserts the enable signal ON. With the enable signal ON, the value of the full instruction address From the program counter register 10 is compared in parallel with all of the cache tags to determine whether a branch cache hit has genuinely occurred.

When a cache hit has genuinely occurred (i.e. at cache line 28), the hit signal is asserted on which causes the reach value latch 16 to latch in the new reach value &X and the target address latch 18 and target instruction latch 20 to output their contents &U and U to the program counter register 10 and instruction fetch stage 6 respectively. The hit signal asserted on also causes the target address latch 18 and the target instruction latch 20 to latch and store the new values &M and M from the cache line 28 for which the cache hit occurred.

Thus, the overall operation can be seen to be that a branch cache read attempt is only made when the instruction E has been reached, whereupon the target address TA and target instruction TI following the branch are recovered without the branch instruction F having to be decoded or even entered into the pipeline processor 2.

Figure 5:
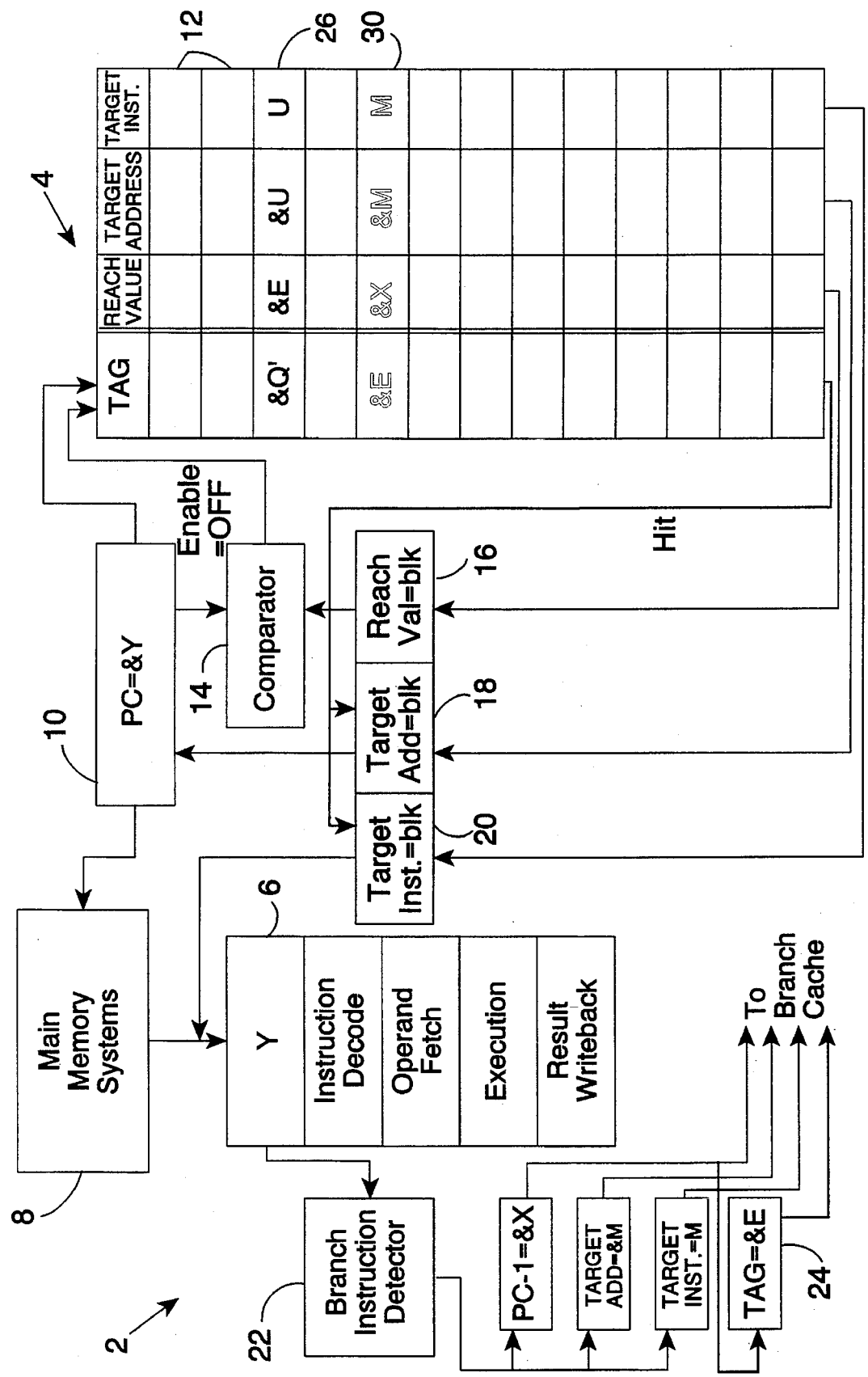
FIG. 5 illustrates the writing of data into the branch cache.

FIG. 5 illustrates the operation of the branch instruction detector 22 in creating branch cache data corresponding to the branch instruction Y. The previous branch instruction was instruction E. Since a next branch instruction following instruction E had not yet been encountered, no branch cache hit would be made using the address &E of instruction E. Nevertheless, this instruction address would be stored in the cache tag latch 24 for use as a cache tag when the next branch instruction was eventually encountered. The program counter register 10 then proceeds to control the recovery of instructions from the main memory system 8 to the pipeline processor 2 until the next branch instruction Y is eventually passed into the instruction fetch stage 6.

The branch instruction detector 22 detects the presence of the branch instruction Y and triggers the saving of the lowermost 8-bits of the instruction address of the preceding instruction X as a PC-1 value, the saving of the target address eventually decoded for instruction Y, namely the address &M of instruction M, and the target instruction M itself. The target instruction M is the last item of data obtained to complete a cache line and once this has been determined a new cache line 30 may be written containing this data.

When during subsequent processing the instruction E is reached, a branch cache hit will occur and the data from cache line 30 will be read from the branch cache 4. As a consequence, when instruction X is subsequently loaded into the pipeline, the comparator 14 will detect a match with the reach value R and will use the target address &M for the instruction M and the target instruction M itself for use by the program counter register 10 and the instruction fetch stage 6.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
    (a) a pipeline processor for processing a stream of instructions;
    (b) a branch cache memory having a plurality of cache lines, each said cache line being operable to store:
        (i) a cache tag identifying an address of a branch instruction within said stream of instructions; and
        (ii) next branch data identifying an address of a next branch instruction processed following said branch instruction; and
    (c) cache read triggering means which responds when said next branch data of a most recently read cache line identifies an address being processed by said pipeline processor to trigger comparison of said cache tags of said plurality of cache lines with said address being processed by said pipeline processor.

2. Apparatus as claimed in claim 1, wherein each cache line is operable to store a branch target pointer identifying an address of a target instruction to be processed after said next branch instruction of said cache line and comprising target address means for controlling branching of said stream of instructions to said target instruction using said branch target pointer when said next branch data of said most recently read cache line identifies said address being processed by said pipeline processor.

3. Apparatus as claimed in claim 2, wherein each cache line is operable to store said target instruction and comprising target instruction means for supplying said target instruction of said cache line to said pipeline processor when said next branch data of said most recently read cache line identifies said address being processed by said pipeline processor.

4. Apparatus as claimed in claim 1, wherein, for each cache line, said cache tag comprises an address of an instruction immediately preceding said branch instruction.

5. Apparatus as claimed in claim 1, wherein, for each branch line, said next branch data identifies an address of an instruction immediately preceding said next branch instruction.

6. Apparatus as claimed in claim 5, wherein said next branch data comprises lower order bits of an address.

7. Apparatus as claimed in claim 5, comprising a program counter register for storing said address being processed by said pipeline processor and wherein said cache read triggering means comprises a comparator for comparing said address from said program counter register and said next branch data to generate an enable signal for said branch cache memory.

8. Apparatus as claimed in claim 1, comprising a branch instruction detector for detecting branch instructions within said stream of instructions to generate a branch detect signal, cache write means responsive to said branch detect signal for writing to a cache line next branch data derived from said address being processed by said pipeline processor and a cache tag derived from an address being processed by said pipeline processor when an immediately preceding branch instruction was detected.

9. Apparatus as claimed in claim 8, wherein each cache line is operable to store said target instruction and comprising target instruction means for supplying said target instruction of said cache line to said pipeline processor when said next branch data of said most recently read cache line identifies said address being processed by said pipeline processor and said cache write means decodes said branch instruction to determine and write to said cache line said branch target pointer and said target instruction.

10. A method of processing data comprising the steps of:
    (a) pipeline processing a stream of instructions;
    (b) storing in each cache line of a branch cache memory having a plurality of cache lines:
        (i) a cache tag identifying an address of a branch instruction within said stream of instructions; and
        (ii) next branch data identifying an address of a next branch instruction processed following said branch instruction; and
    (c) responding when said next branch data of a most recently read cache line identifies an address being processed by said pipeline processor to trigger comparison of said cache tags of said plurality of cache lines with said address being processed by said pipeline processor.

* * * * *